United States Patent [19]

Chandra et al.

[11] Patent Number: 4,586,821
[45] Date of Patent: May 6, 1986

[54] OPTICAL ANGULAR/LINEAR MOTION DETECTOR

[75] Inventors: Suresh Chandra, Falls Church; Robert S. Rohde, Springfield, both of Va.

[73] Assignee: The United States of America as represented by the Secretary of the Army, Washington, D.C.

[21] Appl. No.: 652,041

[22] Filed: Sep. 19, 1984

[51] Int. Cl.$^4$ .............................................. G01P 3/36
[52] U.S. Cl. ...................................... 356/363; 356/73
[58] Field of Search ............... 356/345, 359, 363, 153, 356/73, 129, 152; 73/862.34

[56] References Cited

U.S. PATENT DOCUMENTS 2,151,631  3/1939  Williams ............................. 356/345
3,224,323  12/1965  Chitayat ............................. 356/363

FOREIGN PATENT DOCUMENTS 1927171  9/1967  Japan ................................. 356/363

Primary Examiner—Vincent P. McGraw
Assistant Examiner—S. A. Turner
Attorney, Agent, or Firm—Max L. Harwell; Aubrey J. Dunn; Anthony T. Lane

[57]  ABSTRACT

Angular movements of an object are detected using a laser beam reflected from a mirror on the object and focussed on the edge of a straight edge in front of a photodetector. The same laser beam may be used with the same photodetector to simultaneously or separately form a Michaelson interferometer for detecting linear movements of the object. Alternatively, two photodetectors may be used such that linear and the combination of rotational and angular movements are detected simultaneously, and three photodetectors are used to detect simultaneously linear, rotational, and the combination of linear and rotational movements. In all embodiments, a telescope multiplies mirror movement by the magnifying power of the telescope.

6 Claims, 6 Drawing Figures

OPTICAL ANGULAR/LINEAR MOTION DETECTOR

The invention described herein may be manufactured, used, and licensed by the U.S. Government for governmental purposes without the payment of any royalties thereon.

BACKGROUND OF THE INVENTION

This invention is in the field of optical detectors for small physical motions. Perhaps the oldest such detector is the mirror galvonometer, wherein small angular movements of a mirror carried by a galvonometer coil are detected by reflecting a spot of light off the mirror onto a relatively distant scale. Nowdays, small linear movements may be detected by such devices as the Michaelson interferometer. The instant invention is able to detect simultaneously both linear and rotational or angular movements. Moreover, the rotational motion is detected to a much finer degree than has been previously achieved.

SUMMARY OF THE INVENTION

The invention is an optical system for detecting small angular or linear movements of a body. The invention has three embodiments, one with a single photodetector capable of separately detecting either type of movement or a combination of both movements, a second capable of simultaneously detecting both movements using two photodetectors, and a third capable of simultaneously detecting both movements and a combination thereof with three photodetectors. In all embodiments, linear movements are detected by a Michaelson interferometer technique, wherein a laser light beam is split, a portion of the beam being directed to a reflector on the object, and another portion being directed onto a photodetector. The light reflected from the mirror is also directed onto the photodetector. Angular movements are detected by directing light reflected from the mirror (on the object) past a straight edge onto a photodetector.

DESCRIPTION OF EMBODIMENTS

Figure 1:
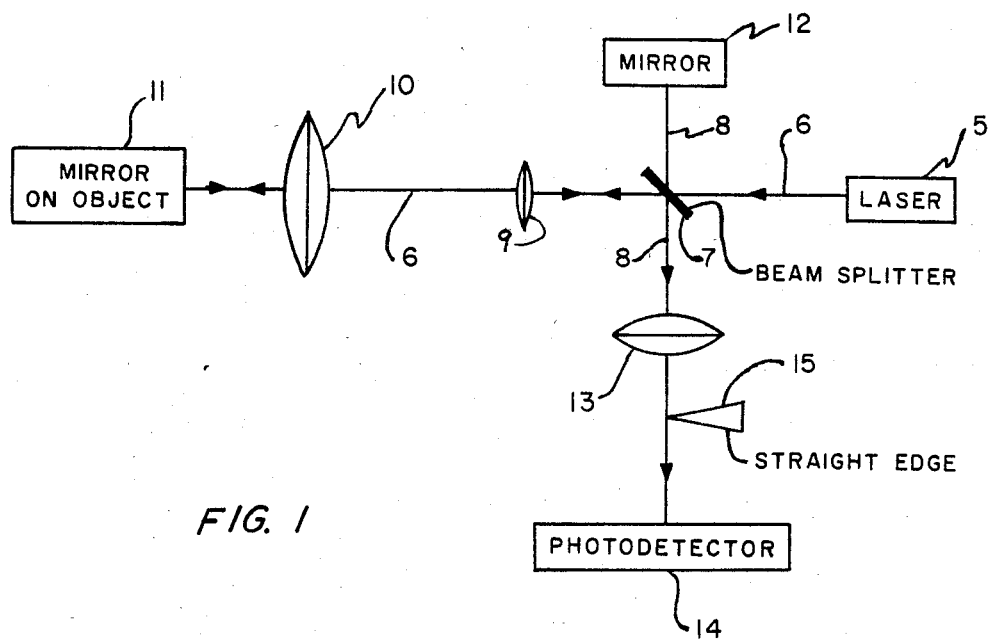
FIG. 1 is a schematic showing of one embodiment of the invention.

The invention may be best understood when this description is taken in conjunction with the drawings. In FIG. 1, numeral 5 designates a laser which provides a reference light beam for the invention. This beam, directed along optical path or axis 6, is split by beam splitter 7 into beams along axes 6 and 8. The beam on axis 8 is directed upward, as shown on the drawing. The beam on axis 6 is directed through a telescope consisting of lenses 9 and 10 toward mirror 11 on an object whose movements are to be detected. Light reflected from 11 passes back through the telescope and is split by beam splitter 7, with a portion being reflected downward on axis 8. That portion of the output beam from laser 5 which was directed upward from beam splitter 7 is retroreflected by mirror 12, and a portion of the retroreflected beam passes down along axis 8, the same as the light reflected from mirror 11. Lens 13 directs these reflected beams onto photodetector 14. The interference pattern produced between the beams is detected by photodetector 14 in the usual Michaelson interferometer technique and is related to object linear movement. For angular object movements, mirror 12 is removed and straight edge 15 is inserted such that the light reflected from mirror 11 is focussed onto the edge of 15 and a diffraction pattern falls onto photodetector 14. If mirror 12 is left in place when 15 is inserted, both types of movements may be detected simultaneously.

Figure 4A:
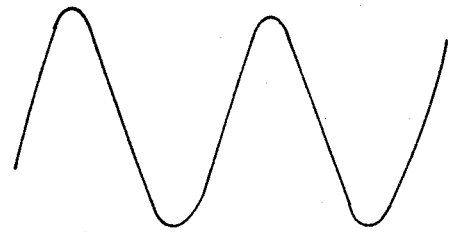
FIG. 4a, 4b, and 4c show typical photodetector output waveforms for different motions of an object; 4a is for angular motion only of a object, 4b is for linear motion only, and 4c is a combined signal showing both angular and linear motion.
Figure 4B:
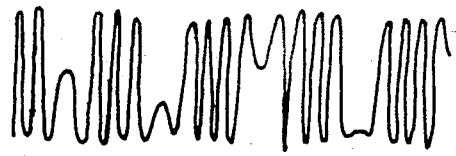
Figure 4C:
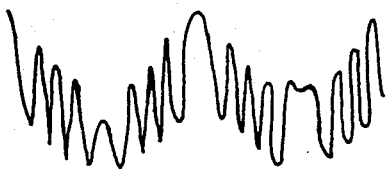

As mirror 11 rotates, the light reflected from therefrom moves off axes 6 and 8, and more or less of this light passes straight edge 15. The signal output amplitude of photodetector 14 is thus directly related to the rotation of mirror 11, ignoring any background or target radiation. FIG. 4a is a typical output waveform from photodetector 14 with straight edge 15 in place, and mirror 12 omitted, in order to detect angular movement. FIG. 4b is a typical output waveform from 14 with mirror 12 in place and with straight edge 15 removed, and is for linear movement. FIG. 4c shows a waveform which shows both movements simultaneously, when both mirror 12 and edge 15 are in place.

Figure 2:
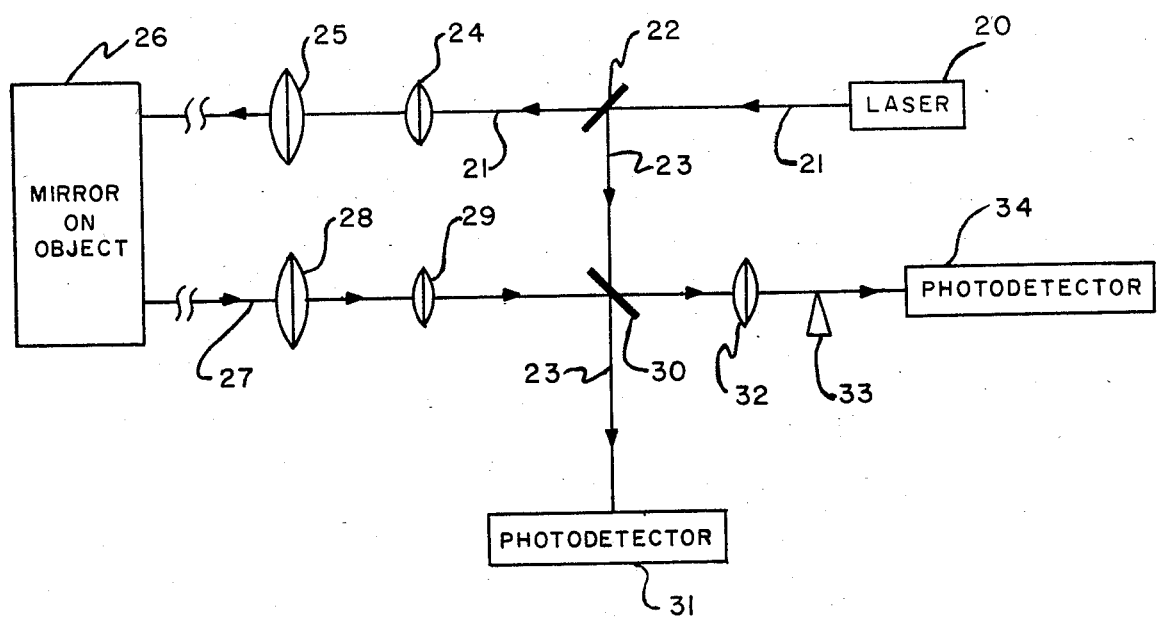
FIG. 2 is a schematic showing of another embodiment of the invention.

FIG. 2 shows an embodiment wherein angular and linear motion may be detected simultaneously from a single photodetector. In this embodiment, 20 designates a laser which provides a reference beam along optical axis 21. This beam is split by beam splitter 22 into portions along axis 21 and along axis 23. A telescope consisting of lenses 24 and 25 directs the light along 21 to mirror 26 on the object whose motion is to be detected. Light is reflected from 26 along optical axis 27, is focussed by a telescope consisting of lenses 28 and 29, and is split by beam splitter 30. A portion of the light is reflected by 30 along axis 23 to photodetector 31 and the remainder passes through 30 along optical axis 27 to lens 32. This lens focusses the light onto straight edge 33; a portion of this light from 33 then passes on to photodetector 34. Photodetector 34 thus provides an output related both to linear movement of the object by the Michaelson interferometric technique and to angular movement of the object, and photodetector 31 provides an output related to linear movement.

A typical output waveform for 31 is shown in FIG. 4b, and the output of 34 is shown in FIG. 4c. Although axes 21 and 27 appear parallel on the drawing and touch 26 at different points, it should be understood that they converge to a common point on 26.

Figure 3:
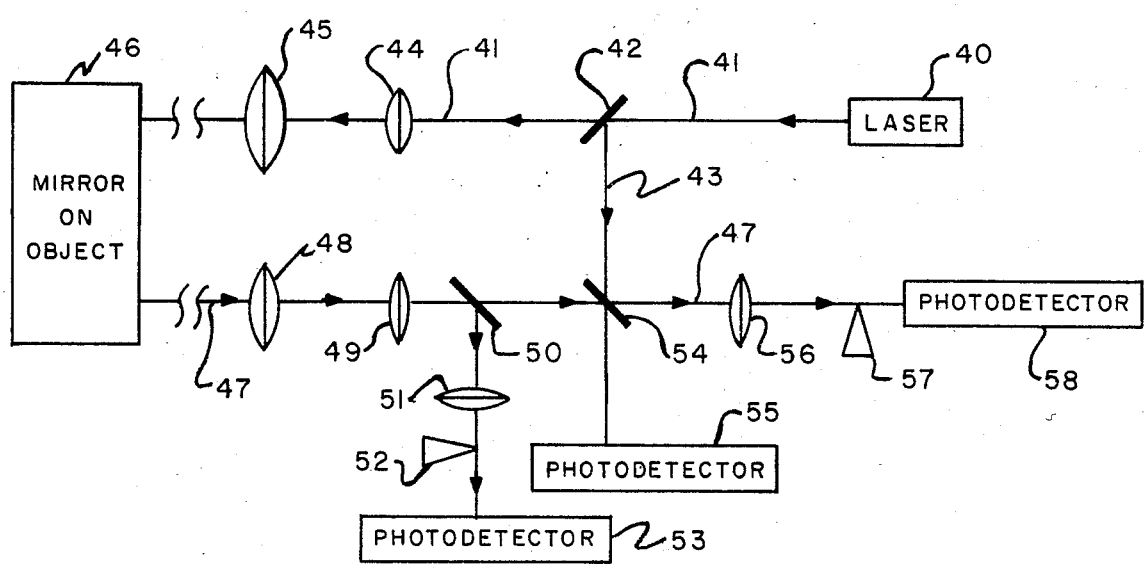
FIG. 3 is a schematic showing of yet another embodiment of the invention.

FIG. 3 shows an embodiment wherein angular, linear, and combination movements are detected simultaneously, but by different photodetectors. In this figure, laser 40 provides a reference beam along axis 41; this beam is split by beam splitter 42 into a portion along axis 41 and another portion along axis 43. The portion along axis 41 is directed by a telescope consisting of lenses 44 and 45 towards mirror 46 on an object. Light reflected from 46 along axis is directed by a telescope consisting of lenses 48 and 49 onto beam splitter 50. A portion of the light is reflected into lens 51, which focusses it onto straight edge 52. The light passing 52 falls on photodetector 53; this detector has an output indicative of mirror angular or rotational movement, and would have an output of the type as shown in FIG. 4a. That portion of light not reflected by 50 passes on to beam splitter 54; a portion is transmitted along axis 47, and a portion is reflected along axis 43 to photodetector 55. The output of 55 is indicative of linear or translational mirror movement, and will have the output waveform similar to that shown in FIG. 4b. Beam splitter 54 also acts on the light reflected by splitter 42 along axis 43; a portion is transmitted, and a portion reflected along axis 47. Lens 56 focusses the radiation transmitted by and reflected by splitter 54 onto edge 57, from whence it falls into photodetector 56. This photodetector gives an output simultaneously related to both linear and rotational movement of 46, and will have an output waveform in the manner of FIG. 4c.

The telescope used in each embodiment of the invention is critical to the sensitivity of the invention, since its use multiplies the reflected beam movement by the magnifying power of the telescope.

We claim:

1. An optical device for detecting angular or linear motion of an object by the motion of a mirror affixed thereto, including:
   a photodetector;
   a laser for providing a beam of light;
   means for directing a first portion of said light onto said mirror and selectively directing a second portion of said light toward said photodetector, and for directing at least a part of the first portion of said light reflected from said mirror toward said photodetector;
   a straight edge interposable between said means for directing and said photodetectors;
   a lens for focussing light from said means for directing onto the edge of said straight edge when said straight edge is interposed, whereby when said second portion of said light and that part of said first portion of said light reflected from said mirror, both are focussed on said photodetector, said photodetector has an output indicative of linear motion of said target, and whereby when said straight edge is interposed and said second portion of said light is not selectively directed, at least a part of the first portion of said light reflected from said mirror is directed toward said photodetector, and is focussed thereon, and whereby said photodetector has an output indicative of angular motion of said target, further whereby when said straight edge is interposed and when said second portion of said light is directed toward said photodetector, at least a part of the first portion of said light reflected from said mirror and at least a part of said second portion of said light are focussed onto said photodetector, whereby said photodetector has an output indicative of both linear and angular motion.

2. The device as set forth in claim 1 wherein said means for directing includes a beam splitter, a telescope, and a retroreflective mirror.

3. An optical device for detecting angular or linear motion of an object by the motion of a mirror affixed thereto, including:
   a laser for providing a beam of light;
   a first photodetector; first means for directing a first portion of said light among a first path to said mirror, and a second portion along a second path towards said first photodetector;
   a second photodetector;
   second means for directing a first portion of light reflected from said mirror along a path toward said second photodetector and a second portion thereof along a path toward said first photodetector;
   a lens and a straight edge in said path between said second means for directing and said second photodetector, whereby said lens focusses light in said path onto the edge of said straight edge, wherein said first photodetector has an output related linear motion of said object, and said second photodetector has an output related both to linear and angular motion of said object.

4. The device as set forth in claim 3 wherein each of said means for directing includes a beam splitter and a telescope.

5. An optical device for detecting angular or linear motion of an object by the motion of a mirror affixed thereto, including:
   a laser for providing a beam of light;
   a first photodetector;
   first means for directing a first portion of said light toward said mirror, and a second portion thereof toward said first photodetector;
   second and third photodetectors;
   second means for directing a portion of said first portion of said light reflected from said mirror toward said second photodetector, and another portion thereof toward said third photodetector;
   third means for directing a part of said second portion of said light toward said second photodetector;
   a lens and a straight edge between each of said second and third means for directing and said second and third photodetectors, whereby the light from each said means for directing is focussed on the edge of said straight edge by said lens, and whereby said first photodetector has an output related to linear motion of said object, said second photodetector has an output related both to linear and to angular motion of said object, and said third photodetector has an output related to angular motion of said object.

6. The device as set forth in claim 5 wherein said first and second means for directing each include a beam splitter and a telescope, and wherein said third such means is a beam splitter.

* * * * *